(No Model.)
H. DANIEL.
EDGE SETTING TOOL.
No. 553,777. Patented Jan. 28, 1896.
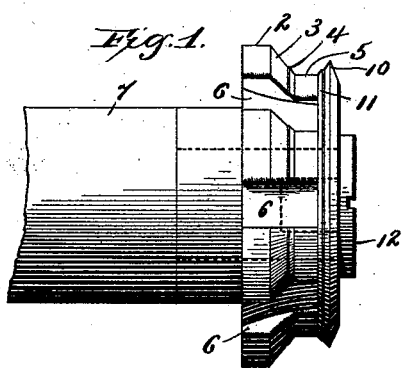
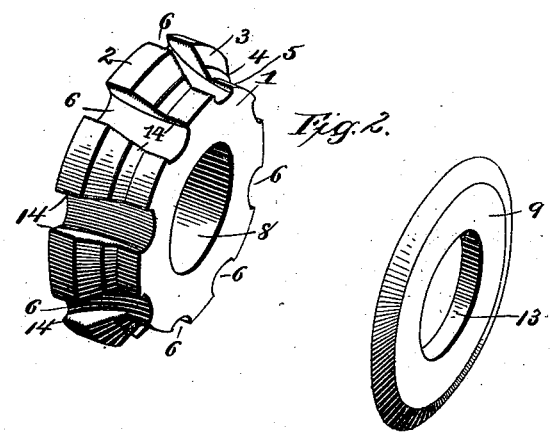
Witnesses
E. C. Wurdeman
S. S. Williamson
Inventor
Harry Daniel
By Geo. H. Holgate
Attorney

UNITED STATES PATENT OFFICE.

HARRY DANIEL, OF PHILADELPHIA, PENNSYLVANIA, ASSIGNOR, BY MESNE ASSIGNMENTS, TO WILLIAM B. LARK, OF SAME PLACE.

EDGE-SETTING TOOL.

SPECIFICATION forming part of Letters Patent No. 553,777, dated January 28, 1896.

Application filed May 21, 1895. Serial No. 550,044. (No model.)

*To all whom it may concern:*

Be it known that I, HARRY DANIEL, a citizen of the United States, residing at Philadelphia, in the county of Philadelphia and State of Pennsylvania, have invented certain new and useful Improvements in Edge-Setting Tools for Shoes, of which the following is a specification.

My invention relates to a new and useful improvement in tools for burnishing the edges of shoe-soles, and has for its object to provide a tool of this description which shall be adapted to operate by a continuous rotary motion, whereby the operator is enabled to more perfectly control the work in hand than is the case when a reciprocating tool is used.

With this end in view my invention consists in the details of construction and formation hereinafter so fully set forth in the specification and designated by the claim that those skilled in the art to which it appertains may understand how to make and use the same, reference being had to the accompanying drawings, forming a part of this specification, and in which—

Figure 1 is a side elevation of my improved tool in operative position upon a spindle, and Fig. 2 is a dismembered perspective showing the two sections of which the tool is composed.

Similar numbers denote like parts in both the figures of the drawings.

1 represents the burnishing-disk, the periphery of which is composed of the horizontal section 2, inclined section 3, which terminates in the rib 4, and the horizontal section 5, of smaller diameter than the section 2 and connected thereto by the inclined section 3 and rib 4. These sections are broken by the grooves 6 cut at right angles thereto in the circumference of said disk.

7 represents a spindle which may receive a rotary motion from any suitable source, such as a gear or belt and pulley, and its outer end is adapted to receive the disk 1, which latter is provided with the hole 8, through which the reduced end of the spindle passes.

9 is a disk whose periphery is beveled, the inner end being composed of the section 10 and rib 11, the latter being similar to the rib 4 formed upon the disk 1.

In securing the disks 1 and 9 upon the spindle they are placed together upon the reduced portion of said spindle, as shown in Fig. 1, and firmly clamped thereon by the screw 12, the head of which is of greater diameter than the holes 8 and 13 in the disks 1 and 9, respectively. Thus it will be seen that a channel is formed by the disks having the angular ribs 4 and 11 and horizontal section 5, and this channel corresponds in width and shape to the edge formed upon a shoe-sole. Therefore to set or burnish the edge of a shoe-sole it is only necessary that the spindle be revolved at a proper speed and the edge of the shoe-sole moved along within the said channel with sufficient pressure to cause the tool to operate thereon to produce the desired finish. As the tool revolves in one direction only during this operation, it follows that a shoe-sole may be maintained in its proper relative position to said tool with but little difficulty, as the thrust caused by the friction thereon is always in one direction and no vibration is imparted thereto. In practice this is of great advantage, since an operator of comparatively little skill may set shoe-sole edges with equal facility as those of greater skill where the ordinary oscillating tool is used; also more uniform work is produced by the use of my improved tool than is possible of production by the old methods.

The inclined sections 3 and 10 act as guides in directing the work to the channel, so that but little care is necessary in bringing the work into proper relative position to the tool. The edges 14 of the grooves 6 are rounded, in order to prevent undue abrasion during the process of setting or burnishing.

While I have shown my improved tool so formed as to be adapted to one size only, which would necessitate the removal of one tool and the substitution of another for varying sizes of shoes, it is obvious that two might be formed upon disk 1, utilizing both ends thereof, and a disk 9 provided for each, so that two sizes might thus be combined in one tool. I have shown my device made in two parts; but it may be formed of a single piece. It is also obvious that other modifications might be made in the exact shape of my improvement without departing from the spirit thereof, which rests in the broad idea of producing a burnishing or setting tool for shoe-sole edges, adapted to operate upon being rotated, whereby the frictional pressure will always be exerted in one direction without imparting a vibratory motion to the work, and I therefore desire to cover this feature broadly.

What I claim as new and useful is—

In a tool of the character described, the disk having on its periphery horizontal sections 2 and 5, inclined section 3 terminating in a rib 4, grooves 6 cut at right angles thereto, the edges of which are rounded as described, a disk having a beveled periphery the inner bevel ending in a rib 11, the said disks being arranged on a common shaft, as and for the purpose described.

In testimony whereof I have hereunto affixed my signature in the presence of two subscribing witnesses.

HARRY DANIEL.

Witnesses:
S. S. WILLIAMSON,
GEO. McCURDY.